deal with more markings than this by enabling the reading and detection system to separately detect more than three colours and by suitably modifying the processing circuitry.

We claim:

1. Reading apparatus suitable for reading a series of colored markings arranged one behind the other on an object the apparatus comprising an illuminating system for producing an illuminating beam of light capable of illuminating said colored markings provided on an object during relative movement thereof through the beam of light, optical means capable of receiving light from said colored markings and forming an image thereof moving in a first direction past an aperture member, the aperture member having a series of spaced apart optical apertures including first read apertures and at least one relatively smaller recognition aperture, there being further provided means for producing movement of said series of optical apertures in a second direction transverse to said first direction whereby said at least one recognition aperture and said first read apertures move transversely across said image, a color sensitive photoelectric detector arrangement disposed behind the aperture member to receive light from the colored markings and transmitted through any of said first read apertures and said at least one recognition aperture to provide respective reading and recognition signals and means for recognising a reading signal only when a corresponding recognition signal has been detected which shows that said image is correctly aligned with said first read apertures.

2. Reading apparatus according to claim 1 and wherein the said at least one recognition aperture is symmetrically arranged about the central line along which the series of read apertures are arranged.

3. Reading apparatus according to claim 1 and wherein the length of the said at least one recognition aperture lies in the range from 5 to 95% of the length of the read apertures.

4. Reading apparatus according to claim 3 and wherein the length of said at least one recognition aperture lies within the range 30 to 50% of the length of the read apertures.

5. Reading apparatus according to claim 4 and wherein the length of said at least one recognition aperture is approximately 40% of the length of the read apertures.

6. Reading apparatus according to claim 1 and wherein said first read apertures and also said at least one recognition aperture are of rectangular shape and of the same width.

7. Reading apparatus according to claim 1 and wherein the said at least one recognition aperture is disposed intermediate two read apertures and is equally spaced from these read apertures.

8. Reading apparatus according to claim 1 and wherein in addition to said first read apertures and said at least one recognition aperture, the aperture member has at least one reference aperture through which a beam of white light drawn from the illuminating system is projected onto the photoelectric detector arrangement during the movement of said reference aperture past said photoelectric detector arrangement.

9. Reading apparatus according to claim 8 and wherein said reference aperture is a circular aperture arranged on the central line along which said read apertures are spaced apart.

10. Reading apparatus according to claim 9 and wherein said circular reference aperture has a diameter approximately equal to the width of said read apertures.

11. Reading apparatus according to claim 8 and wherein said reference aperture is centrally located between two read apertures.

12. Reading apparatus according to claim 1 and wherein said aperture member includes a code track alongside said series of optical apertures and having a respective code mark associated with each aperture.

13. Reading apparatus according to claim 12 and wherein said code marks are displaced relative to the associated apertures in said second direction.

14. Reading apparatus according to claim 8 and wherein said aperture member comprises a rotatable drum having a cylindrical wall with said series of optical apertures including said reference aperture being provided in said cylindrical wall there being in addition, a further aperture in the hub of said drum in the vicinity of the reference aperture and means for deflecting a portion of the light beam from said illuminating system through said further aperture and via a deflecting mirror fixedly associated with the drum through said reference aperture onto the photoelectric detector arrangement.

15. Reading apparatus according to claim 1 and wherein there is further provided a comparator, means for passing signals generated from said photoelectric detector arrangement and corresponding to an actual colored marking to one input of said comparator, means for passing a second signal representative of a desired color marking to the second input of said comparator and means for passing the output of said comparator in the presence of a corresponding recognition signal to a forward rearward counter for detecting the difference between the number of correct comparisons and incorrect comparisons and means for providing a correct/incorrect signal at the output of said forward-rearward counter depending on the sign and size of said difference.

16. An aperture member suitable for use with the apparatus of claim 1.

17. Reading apparatus according to claim 1 and wherein said aperture member comprises a rotatable drum having a cylindrical wall with said series of optical apertures being provided in said cylindrical wall.

18. Reading apparatus according to claim 1 and wherein the shape of said first read apertures corresponds with the shape of each of said colored markings.

* * * * *

United States Patent [19]

Mills, Jr.

[11] 4,283,624

[45] Aug. 11, 1981

[54] EPITHERMAL NEUTRON DECAY LOGGING

[75] Inventor: William R. Mills, Jr., Duncanville, Tex.

[73] Assignee: Mobil Oil Corporation, New York, N.Y.

[21] Appl. No.: 51,566

[22] Filed: Jun. 25, 1979

[51] Int. Cl.³ .............................................. G01V 5/00
[52] U.S. Cl. .................................... 250/264; 250/269
[58] Field of Search ................ 250/262, 264, 269, 270

[56] References Cited

U.S. PATENT DOCUMENTS

| | | | |
|---|---|---|---|
| 3,385,969 | 5/1968 | Nelligan | 250/269 |
| 3,487,211 | 12/1969 | Youmans | 250/269 |
| 3,497,692 | 2/1970 | Mills, Jr. | 250/269 |
| 3,800,150 | 3/1974 | Givens | 250/269 |
| 4,097,737 | 6/1978 | Mills, Jr. | 250/269 |

Primary Examiner—Davis L. Willis
Assistant Examiner—Janice A. Howell
Attorney, Agent, or Firm—Charles A. Huggett; Michael G. Gilman; George W. Hager, Jr.

[57] ABSTRACT

Method and apparatus for epithermal neutron decay logging wherein the formation under investigation is irradiated with bursts of fast neutrons which are moderated therein to form a population of epithermal neutrons. The decay rate of epithermal neutrons within the formation is measured within an energy range having lower limit which is less than the chemical binding energy of bound hydrogen in the formation. In addition, the decay rate of epithermal neutrons within the formation is measured within a second energy range having a lower limit which is greater than the lower limit of the first energy range.

12 Claims, 4 Drawing Figures

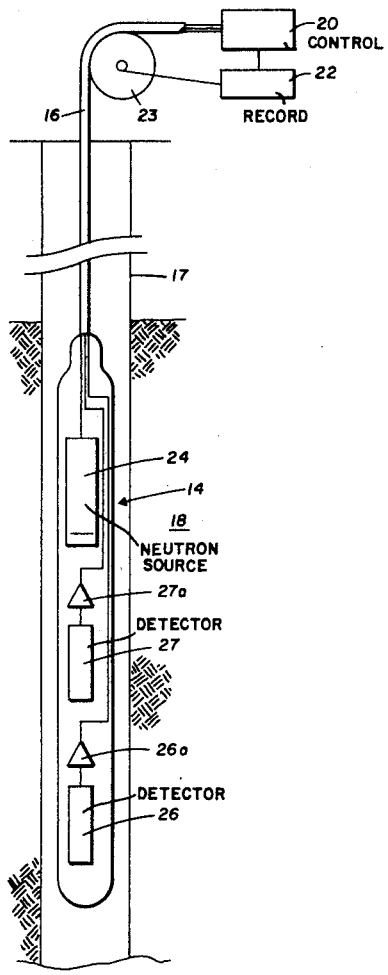

EPITHERMAL NEUTRON DECAY LOGGING

BACKGROUND OF THE INVENTION

This invention relates to radioactive well logging and more particularly to well logging processes and systems for irradiating subterranean formations under investigation with bursts of fast neutrons and characterizing the formation on the basis of the decay of the subsequently produced epithermal neutron population.

Various techniques may be employed in order to characterize subterranean formations with regard to their fluid or mineral content, lithologic characteristics, porosity, or to provide for stratigraphic correlation. The neutron source may be a steady-state source or a pulsed source. For example, neutron porosity logging may be carried out using a steady-state neutron source in order to bombard the formation with fast neutrons. The porosity of the formation then may be determined by measuring thermal neutrons employing two detectors at different spacings from the source or by measuring epithermal neutrons with a single detector.

In pulsed neutron logging procedures, the formations are irradiated with repetitive bursts of fast neutrons, normally neutrons exhibiting an energy greater than 1 Mev. When the fast neutrons enter the formation, they are moderated, or slowed down, by nuclei within the formation to form lower energy neutron populations. The fast neutrons are moderated to lower energy levels by the nuclear collision processes of elastic and inelastic scattering. In elastic scattering the neutron loses a portion of its energy in a collision that is perfectly elastic, i.e., the energy lost by the neutron is acquired as kinetic energy by the nucleus with which it collides. In inelastic scattering only some of the energy lost by the neutron is acquired as kinetic energy by the nucleus with which it collides. The remaining energy loss generally takes the form of a gamma ray emitted from the collision nucleus.

In the course of moderation, the neutrons reach the epithermal range and thence are further moderated until they reach the thermal neutron range. Thermal neutrons are neutrons which are in thermal equilibrium with their environment. The distribution in speed of thermal neutrons follows the so-called Maxwellian distribution law. The energy corresponding to the most probable speed for a temperature of 20° C. is 0.025 electron volt. Epithermal neutrons are those neutrons which exhibit energies within the range from immediately above the thermal neutron region to about 100 electron volts. While the boundary between thermal and epithermal neutrons is, of necessity, somewhat arbitrary it is normally placed in the range of 0.1–1 electron volt.

The populations of neutrons at the various energy levels decay with time following primary irradiation and thus offer means of characterizing the formation. For example, in the case of elastic scattering, which predominates for energies between a few ev and about 1 Mev, the number of collisions required for a neutron to moderate from one energy level to a second lower energy level varies more or less directly with the atomic weight of the nuclei available for collision. In subterranean formations, hydrogen nuclei present in hydrogenous materials such as oil, water, and gas tend to predominate in the slowing down process. Thus, the rate of decay of the epithermal neutron population gives a qualitative indication of the amount of hydrogenous material present which in turn may be indicative of the porosity of the formation. For example, U.S. Pat. No. 3,487,211 to Youmans discloses pulsed neutron logging techniques which involve the detection of thermal neutrons, epithermal neutrons, and fast neutrons. The fast neutron detection in Youmans is employed to monitor the output of the fast neutron source. The epithermal neutron detection is employed to obtain an indication of the decay of the epithermal neutron count in order to arrive at an indication of porosity. Epithermal neutron detection may be accomplished over successive time windows or over two overlapping time windows one of which completely encompasses the other. U.S. Pat. No. 3,800,150 to Givens discloses another pulsed neutron logging technique in which epithermal neutron decay or thermal neutron decay can be measured by employing time windows for detection which partially overlap each other. Thus in the case of the measurement of epithermal neutron decay, the measurement windows may exhibit durations on the order of 20 microseconds with the first time window starting during or immediately upon termination of the fast neutron burst and the second time window beginning perhaps 10 microseconds after the start of the first time window and extending 10 microseconds after termination of the first time window.

SUMMARY OF THE INVENTION

In accordance with the present invention, there are provided new and improved well logging processes and systems in which epithermal neutron decay is measured in a manner to minimize or distinguish the contribution of bound hydrogen in the formation to the decay process. In carrying out the invention, a formation under investigation is irradiated with a burst of fast neutrons which enters the formation and is moderated therein to form a population of epithermal neutrons. The decay rate of epithermal neutrons in the formation is then measured with respect to epithermal neutrons within an energy range having a lower limit which is less than the chemical binding energy of bound hydrogen in the formation. The decay rate measurement thus obtained is then recorded in correlation with the depth within the well at which the measurement is taken. In a preferred embodiment of the invention, an additional decay rate measurement is taken of epithermal neutrons in the formation within a second energy range. The second energy range has a lower limit which is greater than the lower limit of the first energy range. Preferably, the difference between the two decay rate measurements is recorded in correlation with depth.

In a further aspect of the invention, there is provided a well logging system which comprises a logging tool adapted for insertion into a wellbore and a neutron source and detector means in the tool. The neutron source functions to admit repetitive time spaced bursts of fast neutrons. The detector functions to detect epithermal neutrons within an energy range having a lower limit within the range of about 0.1 to about 1 electron volt and preferably no greater than 0.5 electron volt and produces an output signal in response to the detected epithermal neutrons. The system further comprises means for measuring the rate of decline of the output signal from the detector over a time interval between the fast neutron bursts.

Preferably the logging system comprises a second detector which functions to detect epithermal neutrons within a second energy range having a lower limit greater than the lower limit of the first detector and within a range of about 0.5 to about 10 electron volts and preferably no greater than 5 electron volts. Second measuring means associated with this detector measures the rate of decline of the second detector output signal over a second time interval between the fast neutron bursts. Preferably the second detector is located in closer proximity to the neutron source than is the first detector and the rate of decline of the second output signal is measured over a time interval which is shorter in duration and terminates prior to the termination of the first time interval.

DESCRIPTION OF SPECIFIC EMBODIMENTS

Figure 1:
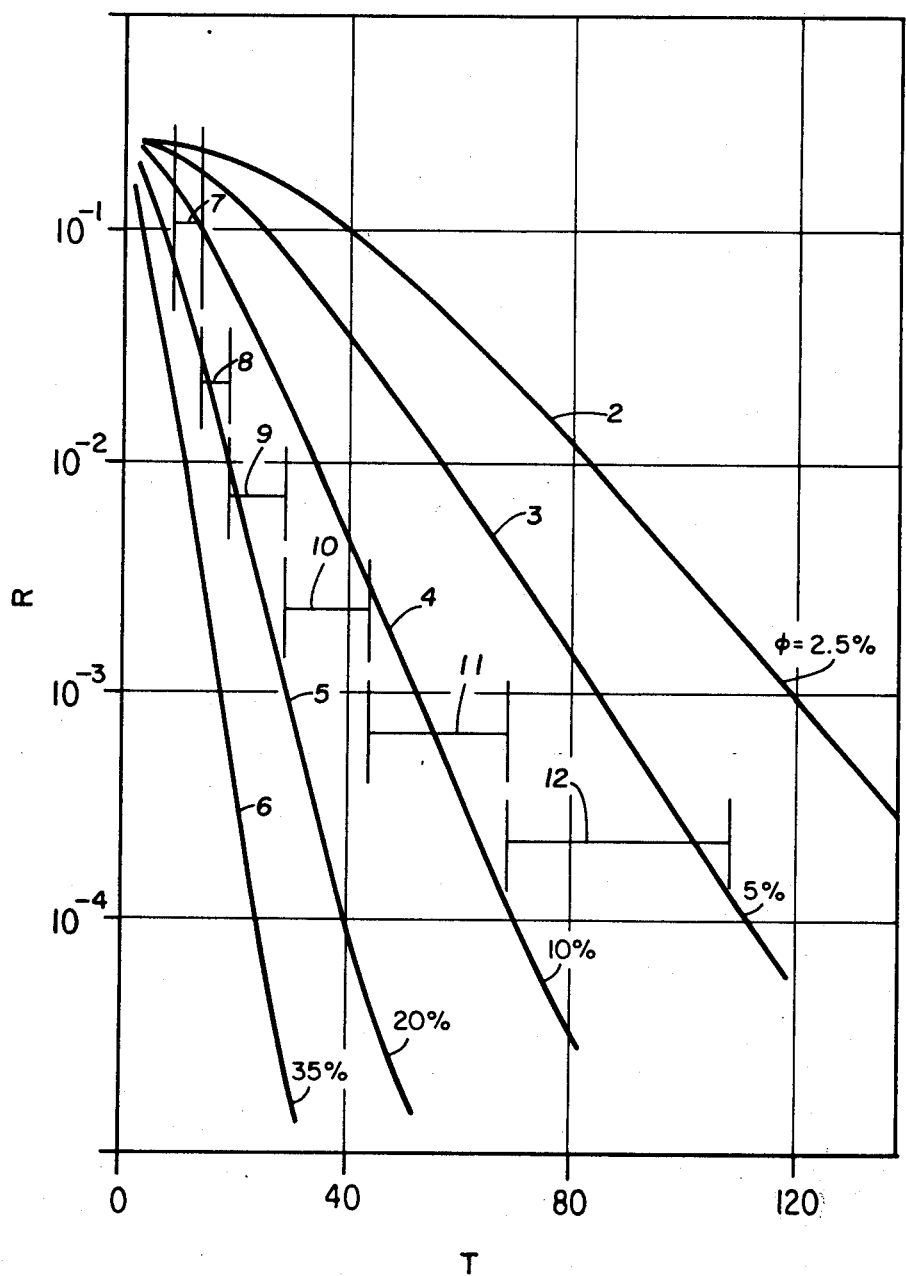
FIGS. 1 and 2 are graphs illustrating epithermal neutron decay curves for different porosities.

As noted previously, the predominant moderating mechanism for electrons with energy between a few ev and about 1 Mev is elastic scattering and in subterranean formations in which well logging operations are carried out, hydrogen nuclei are the predominant factor in the slowing down process. The hydrogen found in this environment may be characterized as falling into two categories. One is hydrogen found in hydrogenous fluids within the formation such as oil and water which are mobile in the formation, i.e. free to move within the formation pore volume. The other is hydrogen which is immobile in the formation. This hydrogen is chemically bound to a formation as $H_2O$ or $OH^-$ as part of the rock matrix or as so-called irreducible water tightly bound to the rock surfaces. Chemically bound water in the matrix may be in the form of water of hydration of minerals such as gypsum or in association with clays such as vermiculite, montmorillonite, halloysite, and/or kaolinite. Hydrogen also may be present in clays as $OH^-$ anions or as exchangeable $H+$ cations in clays such as montmorillonite, kaolinite, chlorite, and illite. The "free hydrogen" is found in free hydrogenous fluids such as water or hydrocarbons. The term "free hydrogen" is used herein to denote hydrogen content of mobile hydrogenous fluids and the term "bound hydrogen" is used herein to denote the hydrogen which is immobile in the formation as described above.

The moderating effect of a hydrogen nucleus upon an epithermal neutron depends upon the energy of the neutron in relation to the chemical binding energy of the hydrogen. For neutron energies significantly greater than the chemical binding of hydrogen in a molecule, all hydrogen atoms regardless of their molecular environment and whether free or bound act as if they are unbound when neutrons scatter from them. Thus the hydrogen atoms are efficient neutron moderators. For neutron energies below the chemical binding energy of the hydrogen, the entire molecule which contains the hydrogen takes part in the scattering reaction. Thus, the neutron acts as though it were scattered from a heavier nucleus and the moderating effect of the hydrogen is significantly less than for scattering reactions which occur at the higher energy levels. The moderating effect of hydrogen upon the relatively low-level energy neutrons is further lessened when the hydrogen is immobile because it is bound to the formation matrix directly through a chemical bond or by physical or chemical adsorption.

From the foregoing discussion it will be recognized that the moderating effect of hydrogen on epithermal neutrons at energies above the chemical binding energy of hydrogen is the same regardless of the molecular environment of the hydrogen atoms. On the other hand, at neutron energies below the chemical binding energy of hydrogen, the molecular environment of the hydrogen nuclei available for elastic scattering reaction becomes significant. The transition between these two energy regimes is not sharp. For example, the bond strength of hydrogen in water at 20° C. is about 4.4 electron volts. At energies of this level and above, the neutron scattering mechanism is substantially "transparent" to the molecular environment of the hydrogen. As the neutron energy falls below 4.4 electron volts, the effect of the molecular environment upon the scattering reaction becomes progressively stronger as the neutron energy level declines.

As noted previously, epithermal neutron decay varies with the amount of hydrogenous material present in the formation and thus epithermal neutron die-away logs can be employed to give an indication of the formation porosity. Thus far, however, prior art epithermal neutron decay logging procedures have failed to distinguish between epithermal neutron decay due to hydrogenous material present in free fluids within the formation, and thus truly a porosity indicator, and hydrogenous material which is fixed to or incorporated within the formation matrix. The present invention provides a means for distinguishing between free hydrogen and bound hydrogen and more particularly provides a process for determining the porosity of a formation as measured by its free fluid content through epithermal neutron die-away measurements.

Secondary radiation induced in a subterranean formation as a result of a primary radiation burst may be characterized as decreasing in time exactly or approximately in accordance with the following relationship:

$$N_2 = N_1 e^{-\lambda t} \quad (1)$$

wherein:
  $N_1$ is the number of radiation events present at a first time $t_1$,
  $N_2$ is the number of radiation events present at a second later time $t_2$,
  e is the Napierian base 2.7183,
  t is the time interval between $t_1$ and $t_2$, and
  $\lambda$ is a decay constant.

As noted in U.S. Pat. No. 4,097,737 to Mills, a portion of the epithermal neutron decay curve resulting from a fast neutron burst will conform approximately to this relationship. Thus by measuring the epithermal neutron count rate at two or more known times, subsequent to the primary radiation burst, the decay constant $\lambda$ may be determined. The value of the decay constant $\lambda$ is in turn an indicator of the amount of hydrogenous material present in the formation.

Depending upon the energy range of epithermal neutrons detected, as determined by the cut-off energy of the detector, the decay constant $\lambda$ may also depend upon the type of hydrogen in the formation. Thus, a detector surrounded by an ideal sharp cut-off filter with a cut-off energy of $V_c$ will be sensitive or insensitive to the state of chemical binding of hydrogen with the formation depending upon the relationship between the cut-off energy, $V_c$, and the speed, $V_b$, corresponding to the chemical bonding energy of hydrogen. For a formation containing both free hydrogen and bound hydrogen and assuming an ideal sharp cut-off filter for the detector, where $V_c$ is equal to or greater than $V_b$, the scattering reactions which influence the measured epithermal neutron decay are the same for bound hydrogen and free hydrogen. For a detector in which $V_c$ is less than $V_b$, the scattering reactions for bound hydrogen have little effect upon the measured epithermal neutron decay and as a result the die-away rate is lower than it would be if all the hydrogen present were free. With no bound hydrogen, $\lambda$ measured by the detector with $V_c$ greater than $V_b$ will be larger than $\lambda$ measured by the detector with $V_c$ less than $V_b$. As the fraction of bound hydrogen increases, $\lambda$ measured with $V_c$ less than $V_b$ will decrease relative to its value if all the hydrogen were free. There is no change in $\lambda$ measured by the other detector as the fraction of bound hydrogen increases.

As noted previously, the decay constant $\lambda$ may be correlated with the neutron porosity of the formation. For a detector having a cut-off speed $V_c$ greater than $V_b$, the total hydrogen content will be measured and the neutron porosity measured will be characterized by the following relationship:

$$\phi = \phi_F + \phi_B$$

wherein:

$\phi$ = measured neutron porosity, $\phi_F$ = neutron porosity of free hydrogen, and $\phi_B$ = neutron porosity equivalent to bound hydrogen.

For a detector with an effective $V_c$ less than $V_b$, the response will be essentially only to the free hydrogen and the measured neutron porosity will be equal to $\phi_F$.

The present invention is carried out employing a pulsed fast neutron source and a detector having a cut-off speed, $V_c$, which is less than $V_b$ to measure the decay rate of epithermal neutrons within an energy range having a lower limit which is less than the chemical binding energy, i.e., the bond dissociation energy, of bound hydrogen in the formation. For reasons noted previously, the detector cut-off energy preferably is well below the chemical binding energy of the bound hydrogen. In most cases, the predominant bound hydrogen will be found in the form of water as water of hydration or as water adsorbed onto the formation surfaces in which case the bond strength of the hydrogen is about 4.4 electron volts. However, somewhat lower chemical binding energies may be encountered. For example, in the hydrogen clays described previously, the chemical binding energy of the hydrogen would be about 2.9 electron volts for hydrogen-aluminum systems. Thus, in order to provide measurements with respect to an epithermal energy range well below the chemical binding energy of hydrogen, it will be desirable to employ a detector having a cut-off energy no greater than 1 electron volt and preferably no greater than 0.5 electron volt. A suitable detector for use in this regard is a helium-3 counter provided with a cadmium-gadolinium filter of the type described in the aforementioned U.S. Pat. No. 4,097,737 to Mills. As described in the Mills patent, a cadmium thickness of about 8 mils and a gadolinium thickness of about 10 mils will provide for a detector cut-off energy of about 0.3 electron volt. This cut-off energy, of course, is well above the predominant energy distribution of thermal neutrons. The detector will exhibit a detection efficiency of near 100% for thermal neutrons or very low energy epithermal neutrons. As the energy level of the neutrons increases the detection efficiency of the detector declines gradually. For example, at a neutron energy of 0.5 ev, the detector efficiency is 65% and at 5 ev, about 35%. Thus, the detector will respond primarily to epithermal neutrons ranging up to energies of several tens of electron volts.

In a preferred embodiment of the present invention, a second epithermal neutron detector is employed to measure the decay rate of epithermal neutrons in a second energy range having a lower limit which is greater than the lower limit of the energy range described above. Ideally, the second detector would have a cut-off energy which is equal to or greater than the chemical binding energy of bound hydrogen so that the scattering reactions influencing the measured decay rate are totally unaffected by the molecular environment of the hydrogen nuclei. However, as a practical matter, the cut-off energy of the second detector may be slightly below the chemical binding energy so long as it is significantly above that of the first detector in order that the molecular environment of the hydrogen nuclei involved in the scattering reactions is of substantially less effect. Preferably, the differential between the cut-off energies of the two detectors will be at least 0.5 electron volt and more desirably at least 1 electron volt. The second detector may also take the form of a helium-3 counter equipped with a suitable filter. For example, where the first detector exhibits a cut-off energy of about 0.3 ev as described above, the second detector may take the form of helium-3 counter surrounded by a cadmium filter of about 500 mils thickness to provide a cut-off energy of about 1 ev.

Where two detectors of different energy levels are employed, the response of the detector with the upper cut-off energy, relative to that of the lower cut-off energy will be primarily with respect to those neutrons which have traveled a shorter distance from a neutron source than those detected by the detector with the lower cut-off energy. Accordingly, it is preferred in carrying out the present invention to locate the detector with the higher cut-off energy closer to the neutron source than the detector with the lower cut-off energy. It will also be preferred as described hereinafter to obtain the decay rate measurement with the detector having the higher cut-off energy over a time interval which is shorter in duration than the time interval employed to obtain the decay rate measurement with the detector having the lower cut-off energy.

Figure 2:
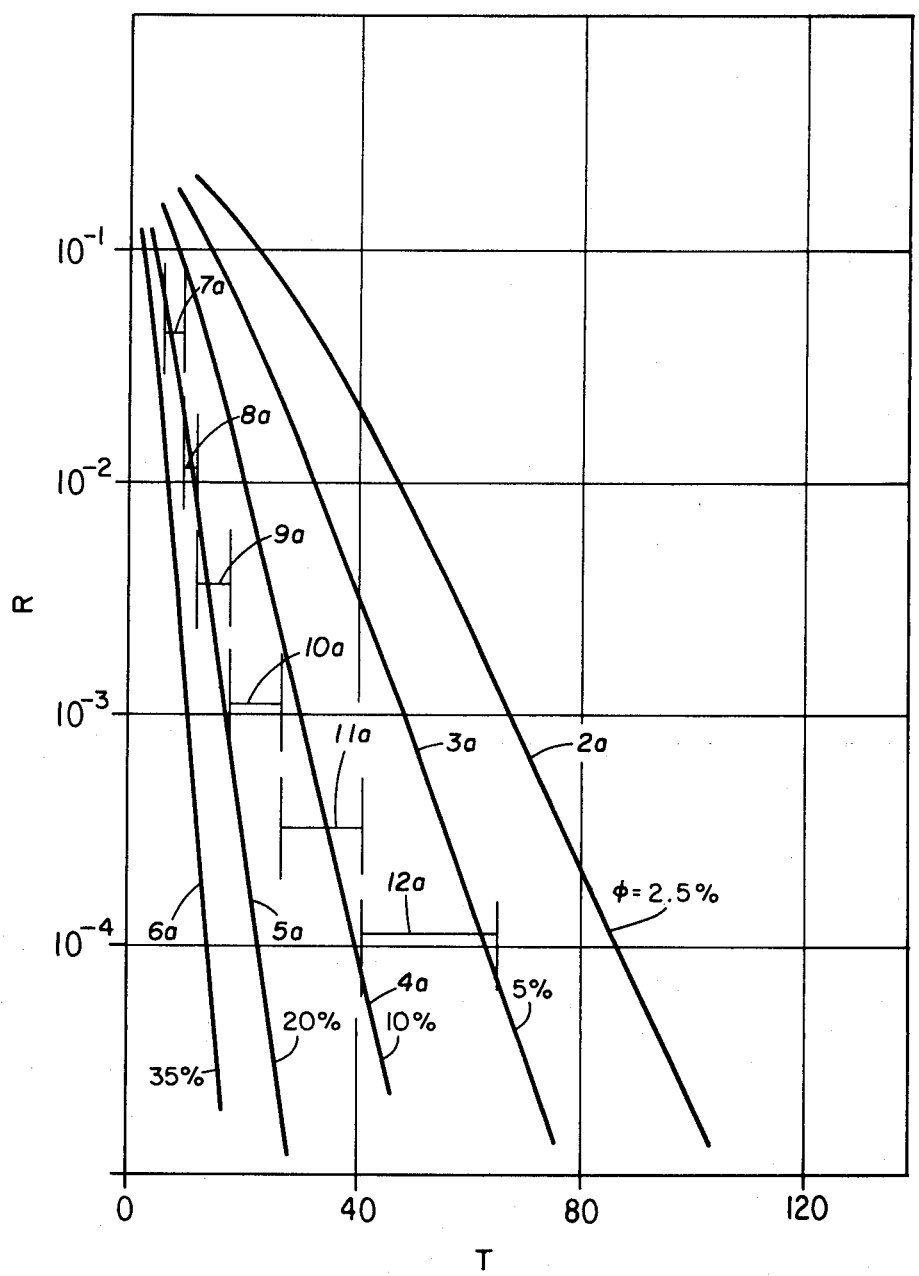

Turning now to the drawings, FIGS. 1 and 2 are graphs illustrating epithermal die-away curves as determined by epithermal neutron decay rate measurements with the detectors having lower and upper cut-off energies, respectively. In each of FIGS. 1 and 2, the logarithm of the reaction rate, R, i.e. the epithermal neutron count rate, is plotted on the ordinate versus the time, T, subsequent to the termination of the fast neutron burst in microseconds plotted on the abscissa. In FIG. 1, curves 2, 3, 4, 5, and 6 are epithermal neutron die-away curves for measured neutron porosities of 2.5, 5, 10, 20, and 35 percent, respectively. The measured neutron porosity in this case is $\phi_F$, that is the porosity of the free hydrogenous fluid in the formation. In FIG. 2, curves 2a, 3a, 4a, 5a, and 6a illustrate the epithermal neutron die-away curves corresponding to the same porosities of 2.5, 5, 10, 20, and 35 percent, respectively. In this case, assuming that the cut-off energy of the detector is sufficiently high so that the molecular environment of the hydrogen exhibits no significant effect upon the scattering reactions, the measured neutron porosity will be equal to $\phi_F$ plus $\phi_B$. From an examination of FIGS. 1 and 2 it can be seen that for a given porosity the decay rate measured by the detector having the lower cut-off energy is significantly less than the decay rate measured by the detector having the higher cut-off energy. Also, as illustrated by FIGS. 1 and 2 and as described in greater detail in the aforementioned patent to Mills, the semilog plot of the die-away curve is substantially linear, i.e. the decay constant $\lambda$ is constant, over only a portion of the epithermal neutron decline period. Over this portion, the decay rate of the epithermal neutrons in the formation can be determined by obtaining count rates within two time windows. Preferably, the time interval over which the count rates are determined to measure the decay rate is shorter for the second detector having the higher cut-off energy than for the first detector because of the higher decay rate associated with the second detector measurements.

Each of the detectors is operated in conjunction with suitable gating circuitry to selectively measure the count rate of the epithermal neutrons over each of a plurality of time windows occurring subsequent to the fast neutron bursts. The gating circuitry may be employed to render the downhole neutron detectors operative or responsive to the epithermal neutrons only during the desired measuring windows or the downhole detectors may be continuously responsive to epithermal neutrons and the gating circuitry then employed to gate the detector outputs to separate measuring channels during the selected time windows. The latter mode of operation usually will be preferred particularly where relatively short time windows are employed.

The epithermal neutron decay may be determined in accordance with any suitable technique involving measuring the count rate during two or more time windows. A reference technique as disclosed in the aforementioned patent to Mills is preferred in order to ensure that the decay rate is determined over a substantially linear portion of the decline curve. This technique involves establishing a plurality of ratio functions from the count rates determined during each of a plurality of successive time windows and comparing these ratio functions with a predetermined reference level.

This mode of operation may be understood by reference to FIG. 1 which shows a plurality of time windows 7 through 12 occurring subsequent to the fast neutron burst. During each time window the output from the detector is gated to a separate measuring channel which includes a count rate meter. In the example illustrated in FIG. 1, the basic time unit is 5 microseconds and time windows 7 and 8 are each 5 microseconds in duration and the durations of time windows 9, 10, 11, and 12 are 10, 15, 25, and 40 microseconds, respectively. The logarithm of the ratio of counts obtained during time windows of equal length is then compared with the reference ratio to select the time windows which fall on the approximate linear portion of the die-away curve. Thus, the logarithm of the ratio of counts obtained during window 7 to the counts obtained during window 8 is compared with the reference value. Next the logarithm of the ratio of the counts obtained during both windows 7 and 8 to the counts obtained during window 9 is compared with the reference value and thereafter the logarithm of the ratio of the sum of the counts during windows 8 and 9 to the counts obtained during window 10 is compared and the process continues with the last ratio measurement being the logarithm of the ratio of the sum of the counts obtained during windows 10 and 11 to the counts obtained during window 12 being compared with the reference value.

A similar mode of operation may be employed in determining the epithermal neutron decay rate associated with the detector having the higher cut-off energy. In this case, the time interval over which the decay rate measurement is obtained is somewhat shorter and the time windows are also shorter than the corresponding time windows associated with the first detector. Thus, the output from the second detector is gated for each of time windows 7a through 12a to separate measuring channels similarly as described above. In this case, the measurement interval is indicated by the start of the first time window 7a which is initiated about 6 microseconds after termination of the neutron burst. Each of the time windows 7a and 8a is 3 microseconds in duration and the time windows 9a, 10a, 11a, and 12a are 6, 9, 15, and 24 microseconds, respectively.

Figures 3, 4:
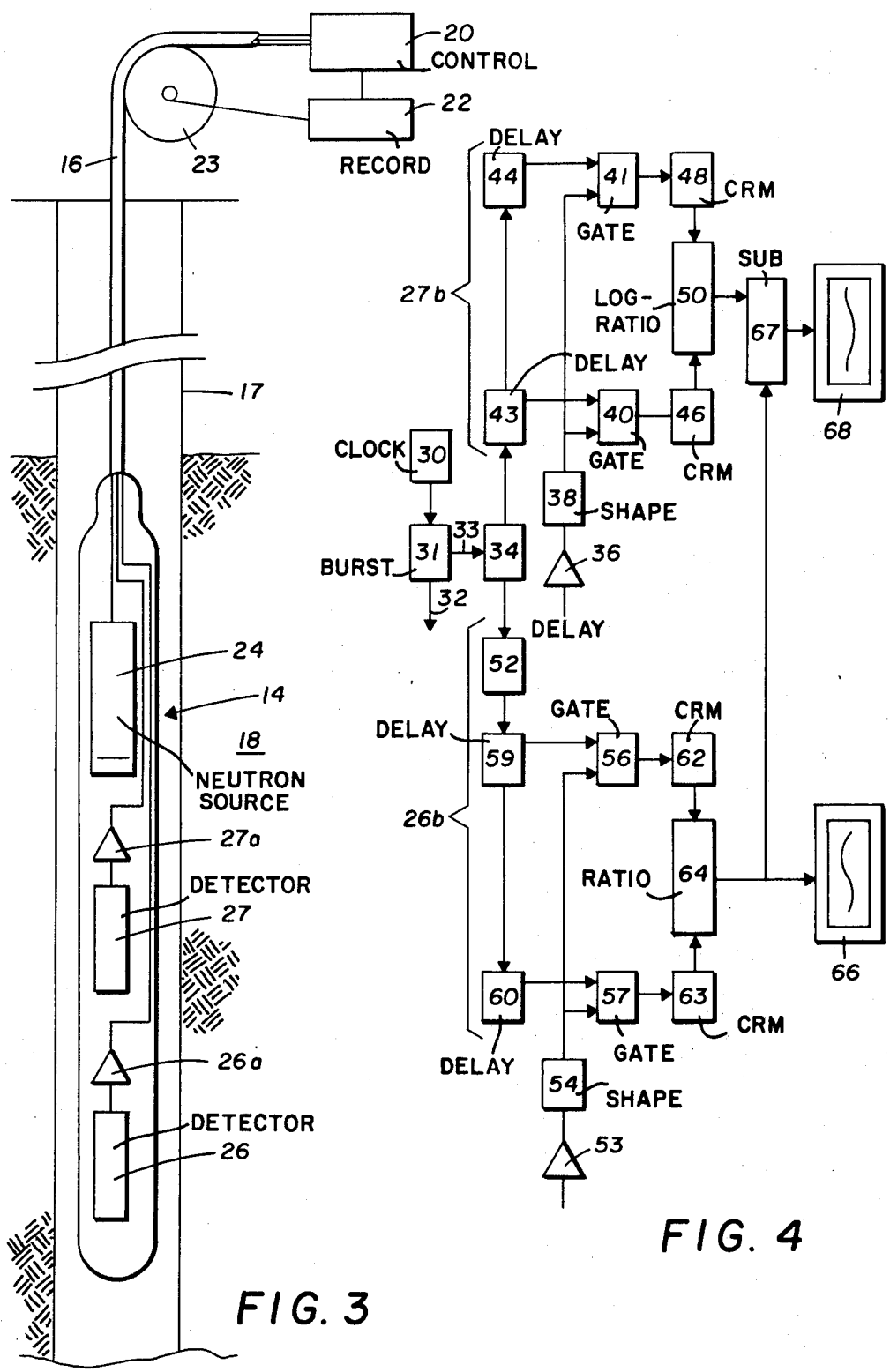
FIG. 3 is a schematic illustration showing a logging system embodying the present invention.
FIG. 4 is a block schematic of a circuitry which may be employed in the system of FIG. 3.

FIG. 3 illustrates a pulsed neutron well logging system in accordance with the preferred embodiment of the present invention. The well logging system comprises a logging tool 14 which is suspended from a cable 16 within a well 17 traversing a subterranean formation of interest illustrated by reference character 18. The well normally will be lined by casing and filled with a fluid such as drilling mud, oil, or water. Signals from the logging tool are transmitted uphole via suitable conductors in the cable 16 to an analyzing and control circuit 20 at the surface. Circuit 20 operates on the downhole measurements as explained in greater detail hereinafter and applies one or more output functions to a recorder 22. Alternatively, all control and measuring circuits may be located within the logging tool and only the signals to be recorded on recorder 22 transmitted over cable 16. As the logging tool is moved through the hole, a depth recording means such as a measuring sheave 23 produces a depth signal which is applied to recorder 22, thus correlating the downhole measurements with the depths at which they are taken.

The logging tool 14 comprises a pulsed neutron source 24 and epithermal neutron detectors 26 and 27 having low and high cut-off energies as described previously. That is, detector 26 has a cut-off energy significantly less than the chemical binding energy of bound hydrogen in the formation and detector 27 has a cut-off energy of about 0.5 or more electron volt above that of the detector 26. The source 24 may be any suitable pulsed fast neutron source but preferably will take the form of a D-T accelerator comprising an ion source of deuterium and a target of tritium. Trigger pulses of a positive polarity are periodically applied under control of the uphole or downhole circuitry to the deuterium source in order to ionize the deuterium. The deuterium ions thus produced are accelerated to the target by a high negative voltage and the resulting reaction between the deuterium ions and the tritium produces bursts of neutrons having an energy of about 14 Mev. The neutron bursts from the source 24 normally will be of a duration of 1 to 5 microseconds with an interval between the bursts of about 50 to 100 microseconds to provide a pulse repetition rate of 10,000 to 20,000 fast neutron bursts per second.

The detectors 26 and 27 are of any suitable type as described previously. While only a single detector of